Sept. 11, 1928.
W. S. SMITH ET AL
1,684,248
CABLE TELEGRAPHY AND THE LIKE AND CIRCUIT THEREFOR
Filed Feb. 23, 1928
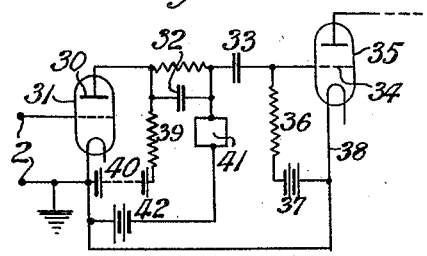
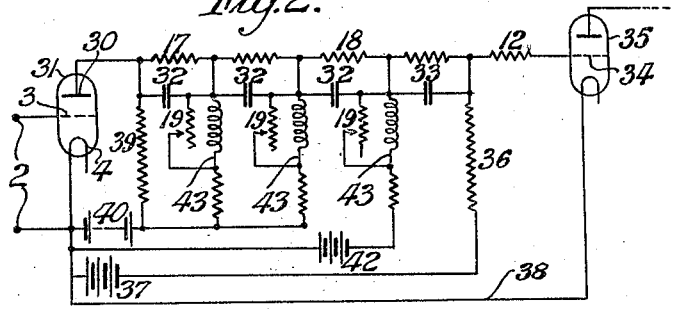
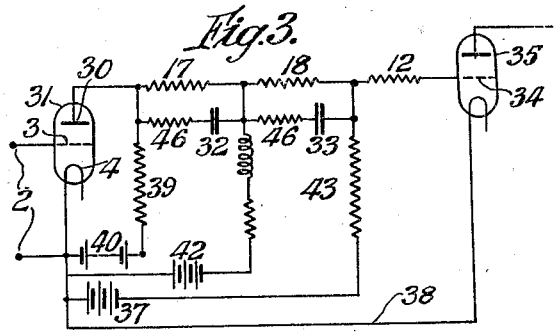
INVENTORS:
W. S. SMITH
N. W. McLACHLAN
W. G. R. JACOB
BY THEIR ATTORNEYS Patented Sept. 11, 1928.

1,684,248

UNITED STATES PATENT OFFICE.

WILLOUGHBY STATHAM SMITH, OF BENCHAMS, NEWTON POPPLEFORD, AND NORMAN WILLIAM McLACHLAN AND WILLIAM GORDON REED JACOB, OF LONDON, ENGLAND.

CABLE TELEGRAPHY AND THE LIKE AND CIRCUIT THEREFOR.

Application filed February 23, 1928. Serial No. 256,402, and in Great Britain August 19, 1926.

This invention relates to thermionic amplifiers of the so-called impedance capacity coupled type, and suitable for use in cable telegraphy and the like and receiving circuits therefor, and more particularly in receiving circuits for use in submarine cable telegraph systems and the like.

As is well known, the so-called impedance capacity coupled amplifier comprises intervalve coupling devices, each consisting of a coupling condenser connected between the anode of one valve and the grid of the following valve, resistances or other suitable impedances being connected one between the said anode and the positive pole of the associated anode battery, and another between the said grid via the associated grid bias battery, if any, to the cathode connection. It will be seen that in such an arrangement the coupling condenser is subjected to a considerable direct current potential from the anode battery, and if the said condenser be leaking, a direct current will flow therethrough, thereby affecting the mean grid potential of the following valve. This may be compensated for in some cases by providing increased grid bias potential, but, if the leakage of the coupling condenser varies, such compensation is of very little use.

According to this invention, we provide means for maintaining the mean grid potential of a subsequent valve in an impedance capacity coupled amplifier substantially constant, the said means comprising in combination an additional condenser of high direct current resistance (or a condenser shunted by a high resistance) connected between the coupling condenser and the preceding anode and an impedance conductive to direct current connected in series with a compensating battery between the junction point of the additional high resistance condenser and the coupling condenser and the cathode connection.

As is well known, submarine cable telegraph systems have the defect that the cable tends to attenuate high frequencies more than low frequencies. If desired therefore the receiver may be provided with means whereby the effects of such differential attenuation may be obviated or reduced. This may be effected by associating with the thermionic valve or valves of the receiver one or more correction net-works, comprising a low frequency high impedance and/or a high frequency high impedance.

If desired means may be provided for effecting phase adjustment.

Also, if desired, means may be provided for limiting the value of the received currents.

The impedance conductive to direct current may comprise a resistance or a resistance and a capacity and/or an inductance, it being necessary only that the said impedance shall have at least one arm conductive to direct current.

The invention is illustrated in the accompanying diagrammatic drawings wherein Figure 1 shows a circuit arrangement for an amplifier embodying the principles of our invention; Fig. 2 illustrates a circuit arrangement for a system of filters utilizing the principles of our invention; and Fig. 3 shows a composite circuit arrangement for shaping the signals and altering the phase or amplitude thereof.

Figure 1 illustrates one embodiment of the invention as applied to a two-valve amplifier. The anode 30 of the first valve 31, to which input connections are made at 2 is connected through two condensers 32, 33 in series to the grid 34 of the next valve 35, the second condenser 33 being the usual coupling condenser. The grid 34 of the second valve 35 is connected through a grid resistance 36 and bias battery 37 to the cathode connection 38, while the anode 30 of the first valve 31 is connected through an anode resistance 39 and anode battery 40 to the cathode connection 38 in the usual way. From the junction point of the two condensers 32, 33, a circuit is completed through an impedance 41 conductive to direct current, thence through a compensating battery 42 to the cathode connection.

It will be seen that, assuming the condenser 32 has a resistance to direct current, high relative to that of the impedance 41, if the compensating battery is equal in potential to the grid bias battery 37 of the second valve, there will be no direct current potential across the coupling condenser. If, however, the condenser 32 is fairly leaky, the compensating battery may be adjusted so that variations in leakage do not cause large potential differences to occur across the coupling condenser 33.

In the modification illustrated in Figure 2, a thermionic valve 31 is arranged as an amplifier, the input being connected at 2 between the grid 3 and cathode 4 of the said valve, if desired, in series with a grid bias battery (not shown). The anode 30 of the valve is connected through an anode resistance 39 and an anode battery 40 to the cathode; and also through correction condensers 32, shaping circuits 43 and the anode battery 40 to the cathode.

The last shaping network 43 is connected through a coupling condenser 33 and a resistance 12 to the grid 34 of a second valve 35, the common point of the said resistance 12 and condenser 33 being connected through a grid resistance 36 and bias battery 37 to a cathode lead 38 common to the two valves. 17, 18 and 19 are shunt resistances, and 42 a compensating battery. The two elements, i. e. coupling condenser 33 and resistance 36, also assist in shaping the signal while the resistance 12 between the grid 34 and condenser 33 serves to reduce tendency to self oscillation, due to energy being fed back via self capacity of valves. The anode circuit of the second valve constitutes either the output circuit of the whole amplifier, or may contain another shaping network. Any number of valves can be cascaded in like manner.

The correction condensers offer a considerable impedance to the low frequency components of the signal, while the correction inductance offers a relatively high impedance to the high frequency components and serves to by-pass such low frequency components as may not have been sufficiently attenuated by the correction condenser. It will be seen, therefore, that the effect is to correct for the action of the cable in attenuating high frequency components, an effect the achievement of which is assisted by the coupling condenser which offers a high impedance to low frequency components, while the resistance in series with the correction inductance assists in shaping.

The shunt resistance 18 and the resistance 36 should be of such value as to preclude the possibility of excessive polarization of the correction inductances in the shaping circuits, and if desired, the said resistances may be made variable and serve to control the value of the said inductances by polarizing them. The resistances 19 and 17 serve to adjust the phases and to control the low frequency impedance.

When it is desired to limit the received current this may be conveniently effected by means of a low frequency impedance large as compared to that of the cable inserted in the input from the said cable. Such an impedance may be constituted in a bridge duplex system by a limit condenser shunted by a high resistance and connected in series with the primary of an input transformer connected across the conjugate points of the well known duplex bridge.

In the case of a simplex system, the impedance may be constituted by a limit condenser shunted by a resistance and connected between the cable and the grid and of an input impedance or resistance whose other end is connected to the cathode and earthed in the usual way. If desired, in simplex systems the limit condenser may be connected in series with the primary of an input transformer, the said primary and condenser being together in parallel with a high resistance connected between the cable and earth.

The invention is applicable to the so-called push-pull receivers, i. e. receivers embodying two thermionic valves arranged back to back, a correction network being associated with each anode circuit of the two valves.

If desired any number of valves may be arranged in cascade, correction networks being associated with any or all of the said valves, so that the signals are shaped and amplified progressively. Further, if desired, any of the elements in a receiver in accordance with this invention may be made variable.

The output from the shaping amplifier may be taken either to a receiving or to a retransmitting arrangement. In the latter case the signals, after being shaped, can be transmitted to another cable, a land line, or used to modulate a radio transmitter, a wired-wireless transmitter or other telegraphic link.

Figure 3 shows a further modification, in which resistances 46 are provided. These resistances serve to alter phase and amplitude and their use is desirable in cases in which the value of the resistance 17, 18 is limited to a value other than that otherwise desirable by the consideration of the amount of polarizing current which can be permitted to flow through the inductance in the circuit.

It will be observed that the sources of potential 42 and 37 employed for the purpose of compensating for the effects of the anode potential of one tube upon the potential of the grid of a succeeding tube, are entirely independent of the source of potential used for impressing a positive charge upon the anode of the first tube. This arrangement permits the selection of proper potential for securing the required compensation and the efficient functioning of the amplifier system. The multiplicity of separate compensating paths which are provided insures the desired degree of compensation in the amplifier.

In all constructions in accordance with the present invention, valves having screened grids and/or valves having indirectly heated cathodes may be employed in order to reduce the influence of inter-electrode capacity.

What we claim is:—

1. An electron tube amplification system including a pair of electron tubes each having grid, filament and plate electrodes, an output circuit for one of said tubes including a source of potential and an impedance connected in series between the plate and filament electrodes of said tube, an input circuit disposed between the grid and filament electrodes of a succeeding electron tube, an impedance, a conductive coupling system disposed between said input and output circuits, and means connected between said impedance conductive coupling system and a point in the output circuit of said first mentioned tube comprising an independent source of potential and an impedance for selectively compensating for the effects of the source of potential in said output circuit upon the grid of said succeeding tube.

2. An electron tube amplifier system including a pair of electron tubes, each having grid, filament and plate electrodes, an output circuit for one of said tubes including an impedance and a source of potential disposed between the plate and filament of said tube, an input circuit for the succeeding tube disposed between the grid and filament electrodes thereof, an impedance capacitative coupling system interlinking the output circuit of one tube with the input circuit of the succeeding tube, and an independent source of potential connected in circuit between said impedance capacitative coupling system and a point in said output circuit for selectively compensating for the effects of said first mentioned source of potential upon the grid electrode of said succeeding electron tube.

3. An electron tube amplifier system including a pair of electron tubes each having grid, filament and plate electrodes, input and output circuits interconnecting said electrodes, a source of potential in said output circuit, a conductive electrical coupling system between said input and output circuits, and an independent circuit disposed between a point in said conductive electrical coupling system and a point in the output circuit of the first tube, and an independent source of potential connected in series in said independent circuit for compensating for the effects of said first mentioned source of potential upon the grid electrode of the succeeding electron tube.

4. An electron tube amplifier system including a pair of electron tubes each having grid, filament and plate electrodes, input and output circuits interconnecting said electrodes, a separate source of potential in each of said circuits, a conductive electrical coupling system between said input and output circuits, and an independent source of potential disposed in circuit between a point in said conductive electrical coupling system and a point in said output circuit for compensating for the effects of the potential source in said output circuit upon the grid of the succeeding electron tube.

5. An electron tube amplifier system including a pair of electron tubes each having grid, filament and plate electrodes, input and output circuits interconnecting said electrodes, separate sources of potential disposed in each of said circuits, a conductive electrical coupling system disposed between said circuits, and a plurality of separate paths between points in said conductive electrical coupling system and a point in said output circuit, each of said paths including separate sources of potential for cooperatively compensating for the effect of the source of potential in said output circuit upon the grid electrode of the succeeding electron tube.

6. An amplification system including a pair of electron tubes having input and output circuits conductively coupled one to the other, a source of potential in the output circuit of the first electron tube, and a plurality of separate circuits disposed between a point in the output circuit of the first electron tube and points along the conductive coupling to the succeeding electron tube, each of said circuits including independent sources of potential and impedances in circuit therewith for controlling the effective values of each of said independent sources for compensating for the effects of said first mentioned source of potential upon the grid electrode of the succeeding electron tube.

In testimony that we claim the foregoing as our invention, we have signed our names this twenty-second day of November, 1927.

WILLOUGHBY STATHAM SMITH.
NORMAN WILLIAM McLACHLAN.
WILLIAM GORDON REED JACOB.